US007076139B1

(12) United States Patent
Aikawa et al.

(10) Patent No.: US 7,076,139 B1
(45) Date of Patent: Jul. 11, 2006

(54) OPTICAL FIBER AND OPTICAL TRANSMISSION SYSTEM

(75) Inventors: Kazuhiko Aikawa, Sakura (JP); Takashi Suzuki, Sakura (JP); Akira Wada, Sakura (JP); Ryozo Yamauchi, Sakura (JP); Takaaki Suzuki, Sakura (JP); Shoichiro Matsuo, Sakura (JP); Manabu Saitou, Sakura (JP)

(73) Assignee: Fujikura Ltd., Tokyo (JP)

( * ) Notice: Subject to any disclaimer, the term of this patent is extended or adjusted under 35 U.S.C. 154(b) by 792 days.

(21) Appl. No.: 09/635,109

(22) Filed: Aug. 9, 2000

(30) Foreign Application Priority Data

Aug. 12, 1999 (JP) .......................... 11-228904
Jan. 20, 2000 (JP) .......................... P2000-012259

(51) Int. Cl.
*G02B 6/02* (2006.01)

(52) U.S. Cl. ........................ 385/123; 385/127
(58) Field of Classification Search .......... 385/123–128
See application file for complete search history.

(56) References Cited

U.S. PATENT DOCUMENTS

| 4,852,968 | A |   | 8/1989  | Reed .................... 385/127 |
| 5,191,631 | A |   | 3/1993  | Rosenberg ............. 385/123 |
| 5,361,319 | A |   | 11/1994 | Antos et al. ........... 385/123 |
| 5,781,684 | A |   | 7/1998  | Liu ...................... 385/124 |
| 5,835,655 | A |   | 11/1998 | Liu et al. .............. 385/124 |
| 5,999,679 | A | * | 12/1999 | Antos et al. ........... 385/127 |

FOREIGN PATENT DOCUMENTS

| EP | 0 789 255    | 8/1997  |
| JP | 09-304640    | 11/1997 |
| JP | 11-084158    | 3/1999  |
| JP | WO 00/62106  | 10/2000 |
| WO | WO096/07942  | 3/1996  |
| WO | WO 99/22257  | 5/1999  |

OTHER PUBLICATIONS

Yanming Liu, et al, "Single–Mode Dispersion–Shifted Fibers with Effective Area Larger Than 80 um2 and Good-bending Performance", ECOC '95 Tu. L.2.4. pp. 333–336, 1995, no month avail.

P. Nouchi, et al, New Dispersion–Shifted Fibers with Effective Area Larger Than 90 um2, EOCC '96 Mob.3.2., 1996, no month avail.

T. Kato, et al, "Ultra–Low Nonlinearity Low–Loss Pure Silica Core Fiber for Long–Haul WDM Transmission", Electronics Letters 16th Sep. 1999, vol. 35, No. 19.

K. Aikawa, et al, "Single–Mode Optical Fiber with Effective Core Area Larger Than 160 um2", EOCC '99 Sep. 26–30, 1999, Nice, France 1–302–1–303.

(Continued)

*Primary Examiner*—Rodney Bovernick
*Assistant Examiner*—Michael J. Stahl
(74) *Attorney, Agent, or Firm*—Chadbourne & Parke, LLP (57) ABSTRACT

An optical fiber is fabricated with a refractive index profile having a central core; a middle part provided around the outer periphery of the central core and having a lower refractive index than that of the central core; and a cladding provided around the periphery of the middle part and having a higher refractive index than the middle part and a lower refractive index than the central core. This optical fiber has an effective core area of 120 $\mu m^2$ or more in an employed wavelength band selected from the range of 1.53~1.63 $\mu m$, and has a cut-off wavelength that is capable of substantially single mode propagation in the aforementioned employed wavelength band. As a result, it is possible to construct an optical transmission system having excellent transmission characteristics in which nonlinearity is decreased.

13 Claims, 3 Drawing Sheets

OTHER PUBLICATIONS

T. Kato, et al, "Ultra Low Nonlinearity Low Loss Pure Silica Core Fiber", 1999, no month avail; The Institute of Electrics, Information and Communication Engineers Electronics Society Meeting C-3-76.

A. Aikawa, et al, "Single-Mode Optical Fiber with Large Effective Core Area" 1999, The Institute of Electrics, Information and Communication Engineers Electronics Society Meeting C-3-77, no month avail.

M. Tsukitani, et al, "Study of Design Organization of SMF and DCF Hybrid Transmission Lines Having Low Loss and Low Nonliniallity", 1999, The Institute of Electrics, Information and Communication Engineers Electronics Society Meeting C-3-78, no month avail.

M. Tsukitani, et al, "Low-Nonlinearity Dispersion—Flattened Hybrid Transmission Lines Consisting of Low Nonlinearity Pure-Silica-Core-Fibers", Technical Report of Ieice, OCS 99-97, Ope 99-101, LQE 99-98 (Nov. 1999), 1999, no month avail.

T. Kato et al, "Ultra Low Nonlinearity Low Loss Pure Silica Core Fiber", OECC '99, pp. 1575-1576, Oct. 1999.

Eisuke Sasaoka et al, "Design Optimization of SMF-DCF Hybrid Transmission Lines For L ong Haul Large Capacity WDM Transmission Systems", OECC '99, pp. 378-379, 1999, no month avail.

* cited by examiner

OPTICAL FIBER AND OPTICAL TRANSMISSION SYSTEM

BACKGROUND OF THE INVENTION

1. Field of the Invention

The present invention relates to an optical fiber and to an optical transmission system employing this optical fiber. More specifically, the present invention relates to an optical fiber having a relatively simple structure, that has an increased effective core area and can reduce nonlinearity in an employed wavelength band selected from the range of 1.53~1.63 µm, and to an optical transmission system employing this optical fiber.

This application is based on patent applications filed in Japan (Japanese Patent Application No. Hei 11-228904 and No. 2000-12259), the contents of which are incorporated herein by reference.

2. Background Art

As erbium-doped optical fiber amplifiers have entered practical use, systems such as very-long-distance non-repeating relays for wavelengths of 1.53~1.63 µm have become commercially available. Further, the development of WDM (wavelength division multiplex) transmission has progressed rapidly with the increase in transmission capacity, with wavelength multiplex transmission already commercially available on a number of transmission paths. Rapid growth in the number of wavelength multiplexes is anticipated in the future.

In WDM transmission, the optical power propagating through the optical fiber is very greatly increased in order to transmit a number of optical signals of different wavelengths in a single optical fiber. For this purpose, it is essential to have a technique for reducing nonlinearity so that deterioration in the transmission characteristics can be avoided.

The size of the nonlinearity is expressed as $n_2$/Aeff, where $n_2$ is the non-linear refractive index for the optical fiber, and Aeff is the effective core area of the optical fiber. In order to decrease the nonlinearity, $n_2$ must be decreased or Aeff must be increased.

Because $n_2$ is a constant value for the material, it is very difficult to significantly decrease $n_2$ in a quartz-derived optical fiber. Accordingly, Aeff must be increased. A number of designs having complicated refractive index profiles have been developed, however, all of these are quite expensive.

On the other hand, 1.3 µm single mode optical fibers have been widely used in conventional transmission systems.

However, when the employed wavelength band is set in the 1.53~1.63 µm range in the case of a 1.3 µm single mode optical fiber, then bending loss (macrobending loss) increases and there is a worsening of the transmission loss that arises due to the slight bending that occurs during laying of the optical fiber.

A cut-off shift optical fiber (CSF) has therefore been proposed in which the bending loss is reduced by making improvements to the 1.3 µm single mode optical fiber.

The CSF has low bending loss in 1.5 µm wavelength band by shifting conventional cut-off wavelength (1.2 µm) of the 1.3 µm single mode optical fiber into 1.4~1.5 µm.

However, since this cut-off shift optical fiber is not intended to control nonlinearity, it does not have an Aeff that is large enough for this purpose.

SUMMARY OF THE INVENTION

The present invention is therefore directed to the provision of an optical fiber in which the Aeff is increased in an employed wavelength band selected from the range of 1.53~1.63 µm.

It is also the objective of the present invention to provide an optical fiber having a relatively simple refractive index profile that can be fabricated at low cost.

In order to resolve the above-described problems, the present invention's optical fiber is provided with a refractive index profile having a central core, a middle part that is provided around the outer periphery of the central core and has a lower refractive index than the central core, and a cladding that has a refractive index that is higher than the middle part but lower than the central core. The present invention's optical fiber has an effective core area that is 120 $\mu m^2$ or larger in an employed wavelength band selected from the range of 1.53~1.63 µm, and has a cut-off wavelength that is substantially capable of single mode propagation in this employed wavelength band. In addition, an optical transmission system can be constructed by disposing a dispersion compensating optical fiber to the side of the optical fiber where the optical signal is emitted for compensating one or both of the optical fiber's wavelength dispersion and dispersion slope.

In the present invention, by adjusting the structural parameters of an optical fiber having a refractive index profile of a relating simple structure, it is possible to provide at low cost an optical fiber which has an increased Aeff and a cut-off wavelength that enables single mode propagation in an employed wavelength band selected in the range of 1.53~1.63 µm. Moreover, bending loss can be reduced to a value that is acceptable to the application.

As a result, the present invention enables the provision of an optical fiber in which a transmission loss is avoided by reducing nonlinearity in an employed wavelength band selected from the range of 1.53~1.63 µm. At the same time, a worsening of transmission loss due to the microbending that occur during installation does not readily occur in the present invention's optical fiber, and single mode propagation is assured.

Further, by combining the present invention's optical fiber with a dispersion compensating optical fiber, it is possible to reduce the degradation of optical signal that is caused by nonlinearity and dispersion characteristics, and to construct an optical transmission system that has excellent transmission characteristics.

DESCRIPTION OF THE PREFERRED EMBODIMENTS

The employed wavelength band for the present invention's optical fiber is selected in the range of 1.53~1.63 µm. For example, a range of 1.53~1.57 µm or 1.57~1.63 µm is suitable selected based on the amplified wavelength band of an erbium-doped optical fiber amplifier composing the transmission system.

Aeff can be determined from the following equation.

$$Aeff = \frac{2\pi \left\{ \int_0^\infty a|E(a)|^2 \, da \right\}^2}{\int_0^\infty a|E(a)|^4 \, da}$$

Where a is the core radius and E(a) is the electric field strength at radius a.

It is desirable that Aeff is big as possible.

Based on investigations conducted by the present inventors, the reduction in nonlinearity when Aeff is less than 120 μm² is insufficient. Therefore, for the present invention's optical fiber, it is indicated that Aeff is 120 μm² or larger, and preferably, 140 μm² or larger.

When Aeff becomes too large, transmission loss may increase for the reasons discussed below. Thus, Aeff is essentially established to be 250 μm² or less.

In other words, when Aeff becomes large, such disadvantages arise as worsening transmission loss due to microbending, and difficulty of inspection during the fabrication process. Moreover, the degree of deterioration will vary depending on the cable's structure. However, worsening transmission loss occurs readily even in such typical usage conditions as the housing of excess length or the bundling of fibers into a cable. When transmission loss increases under such conditions of use, it is necessary to increase the power input. As a result, nonlinearity occur more readily accompanying the increase in the input power. Thus, the effect of controlling nonlinearity by increasing Aeff is diminished.

Bending loss is a value measured with the employed wavelength in a fiber bent at a bend radius (2 R) of 20 mm.

The bending loss characteristics should be determined based on whether the optical fibers have been bundled into a cable and on the environment in which the optical fiber cable is to be used. For example, when a tape-shaped optical fiber is embedded in a tight structural member, then a range of 20 dB/m or less is preferably selected. However, in the case of a so-called "loose tube" optical cable, the range may be 100 dB/m or less since such as large force is not impressed.

In order to reduce the bending loss, it is desirable to shift the cut-off wavelength to the longer wavelengths as much as possible.

Since the present invention's optical fiber is a single mode fiber, it must have a cut-off wavelength that ensures single mode propagation in the employed wavelength band.

The usual cut-off wavelength is measured a 2 m long sample by the bending method as recommended by CCITT-G.652 (hereinafter, referred to simple as "2 m method"). However, under the conditions for use of the optical fiber length, single mode propagation is possible even if this value is further toward the longer wavelengths than the lower limit of the employed wavelength band.

Accordingly, in the present invention's optical fiber, the cut-off wavelength defined by the 2 m method is set to the longer wavelengths so as to enable single mode propagation according to the length of the optical fiber employed and the employed wavelength band, and so as to enable as much of a reduction in the bending loss as possible. Specifically, provided that the cut-off wavelength based on the 2 m method is 1.7 μm or less, then single mode propagation can be realized in a 1.53~1.63 μm employed wavelength band for an optical fiber length of 5000 m or more.

In the present invention's optical fiber, it is preferable that the increase in the sandpaper tension winding loss when an optical fiber is employed as the resin-coated optical fiber be 10 dB/km or less.

The increase in the sandpaper tension winding loss is the value measured by the following method.

Sandpaper {SiC with an average particle diameter of 50 μm (#360, for example)} is wrapped around the trunk portion of a bobbin that has a trunk diameter of 380 mm, and the transmission loss is measured with an resin-coated optical fiber of the structure described below wrapped once around the outer periphery of the sandpaper covered bobbin at 100 gf.

The resin-coated optical fiber is then unwound from the bobbin and the transmission loss is measured while applying almost no tension (this state is referred to as a "non-tension bundle").

The difference in transmission loss between these two states is determined, and is defined as the increase in the sandpaper tension winding loss (Δα)

Figure 1:
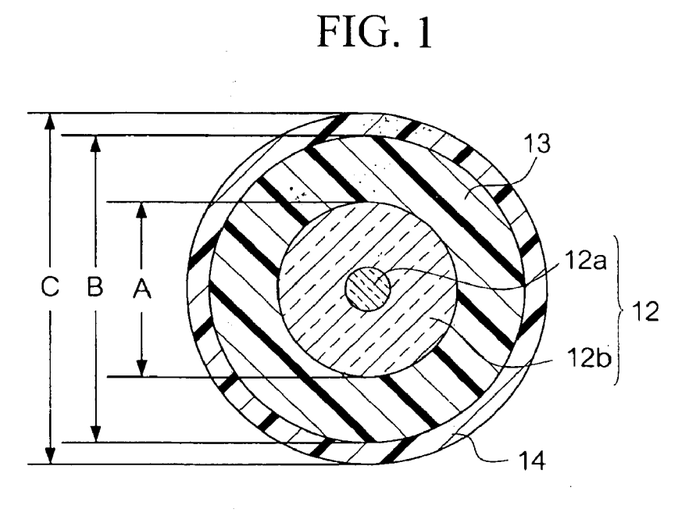
FIG. 1 is a cross-sectional view of one example of an resin-coated optical fiber.

FIG. 1 is cross sectional view showing an example of an resin-coated optical fiber. A primary coating layer 13, consisting of a relatively soft plastic, and a secondary coating layer 14, consisting of a harder plastic than primary coating layer 13, are provided about bare optical fiber 12, which consists of a core 12a and a cladding 12b that is provided around this core 12a.

Bare optical fiber 12 consists of the typical quartz glass derived material. A usual ultraviolet light curable resin having a Young's modulus of 1 Mpa or less is employed for primary coating layer 13, while a UV curable resin having a Young's modulus of 500 Mpa or more is employed for secondary coating layer 14. The UV curable resins that are employed in primary coating layer 13 and secondary coating layer 14 may be selected from among urethane acrylate, polybutadiene acrylate, epoxy acrylate, silicon acrylate or polyester acrylate derived resins.

The outer diameter A of a typical bare optical fiber 12 is in the range of 100~125 μm, the outer diameter B of primary coating layer 13 is in the range of 130~250 μm, and the outer diameter C of the secondary coating layer 14 is in the range of 160~400 μm. More specifically, in the usual 250 μm resin-coated optical fiber, outer diameter A is 125 μm, outer diameter B is 200 μm more or less, and outer diameter C is 250 μm more or less. Moreover, in the usual 400 μm resin-coated optical fiber, outer diameter A is 125 μm, outer diameter B is 240 μm more or less, and outer diameter C is 400 μm more or less.

When the cable structure is a so-called tight structure, then it is preferable that the increase in the sandpaper tension winding loss is selected to be in the range of 1 dB/km or less. In the case of a so-called loose tube optical cable however, a value of 10 dB/km or less is acceptable since the lateral pressure is small. When the increase in the sandpaper tension winding loss becomes large, then such disadvantages arise as an increase in the transmission loss when rendering the fibers into a cable.

The increase in the sandpaper tension winding loss depends on the value of Aeff. It will also vary depending on the outer diameter of the covering of the resin-coated optical fiber and the coating resin employed, however. Specifically, it is preferable that Aeff be 120 μm² or more, and the increase in the sandpaper tension winding loss be 10 dB/km or less. In this case, employment as a loose tube optical cable with a coating outer diameter of 250 μm is possible.

It is preferable that Aeff be 120 μm² or more and the increase in the sandpaper tension winding loss be 1 dB/km or less. In this case, for a coating outer diameter of 250 μm, a fiber in which the Aeff is 120~130 μm² can be used as a loose tube or tight structure optical cable. Alternatively, for a coating outer diameter of 400 μm, a fiber in which the Aeff is 120~160 μm² can be used as a loose tube or tight structure optical cable.

Further, it is preferable that Aeff is in the range of 120~150 μm² and the increase in the sandpaper tension winding loss is 0.3 dB/km or less. In this case, for a coating outer diameter of 400 μm, a fiber in which the Aeff is 120~150 μm² can be used as a tight structure optical cable.

Figure 2:
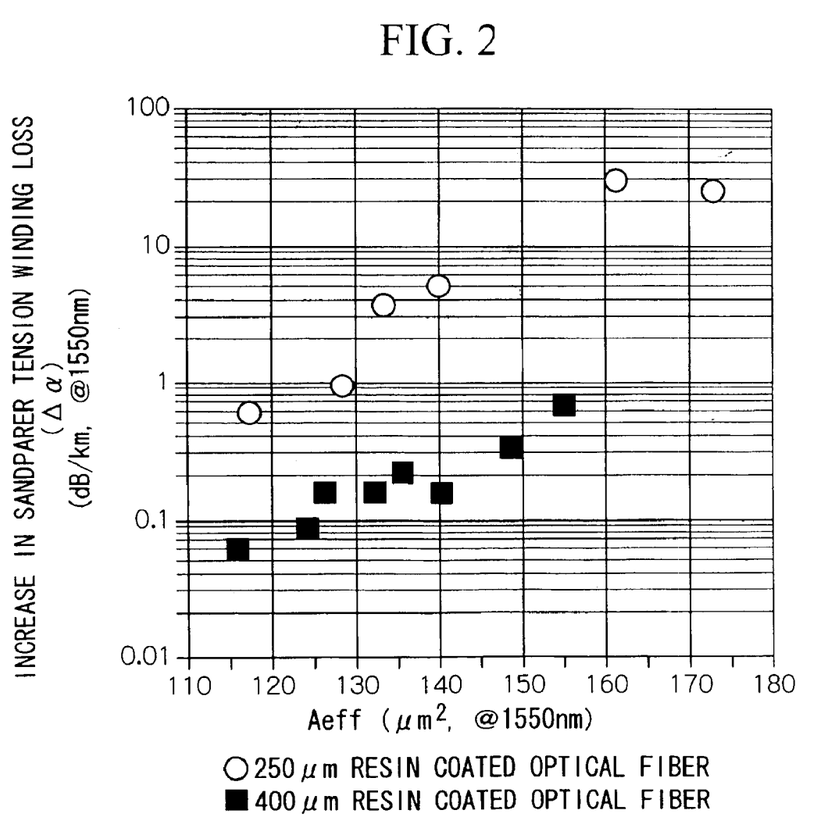
FIG. 2 is a graph showing an example of the relationship between Aeff and the increase in the sandpaper tension winding loss.

FIG. 2 is a graph showing an example of the relationship between Aeff and the increase in the sandpaper tension winding loss. The measured wavelength here is 1550 nm. The resin-coated optical fibers in this example are 250 μm and 400 μm resin-coated optical fibers.

As may be understood from this graph, the increase in the sandpaper tension winding loss grows larger accompanying the increase in Aeff. When Aeff is 150 μm² or less, an optical fiber having a sufficiently small increase in the sandpaper tension winding loss can be provided. Namely, the increase in the sandpaper tension winding loss of the 250 μm resin-coated optical fiber is 10 dB/km or less, and the increase in the sandpaper tension winding loss of the 400 μm resin-coated optical fiber is 1 dB/km or less.

Figure 3:
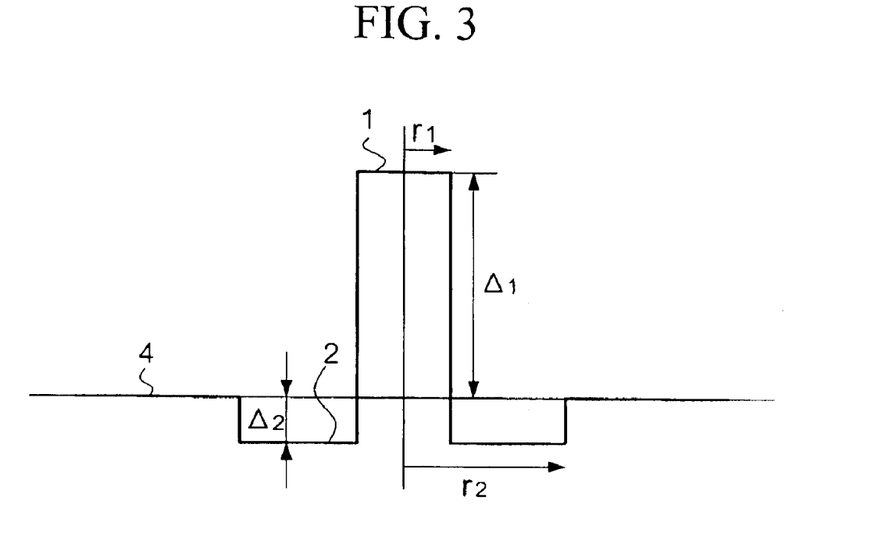
FIG. 3 is a graph showing a first example of the refractive index profile for the present invention's optical fiber.
Figure 5:
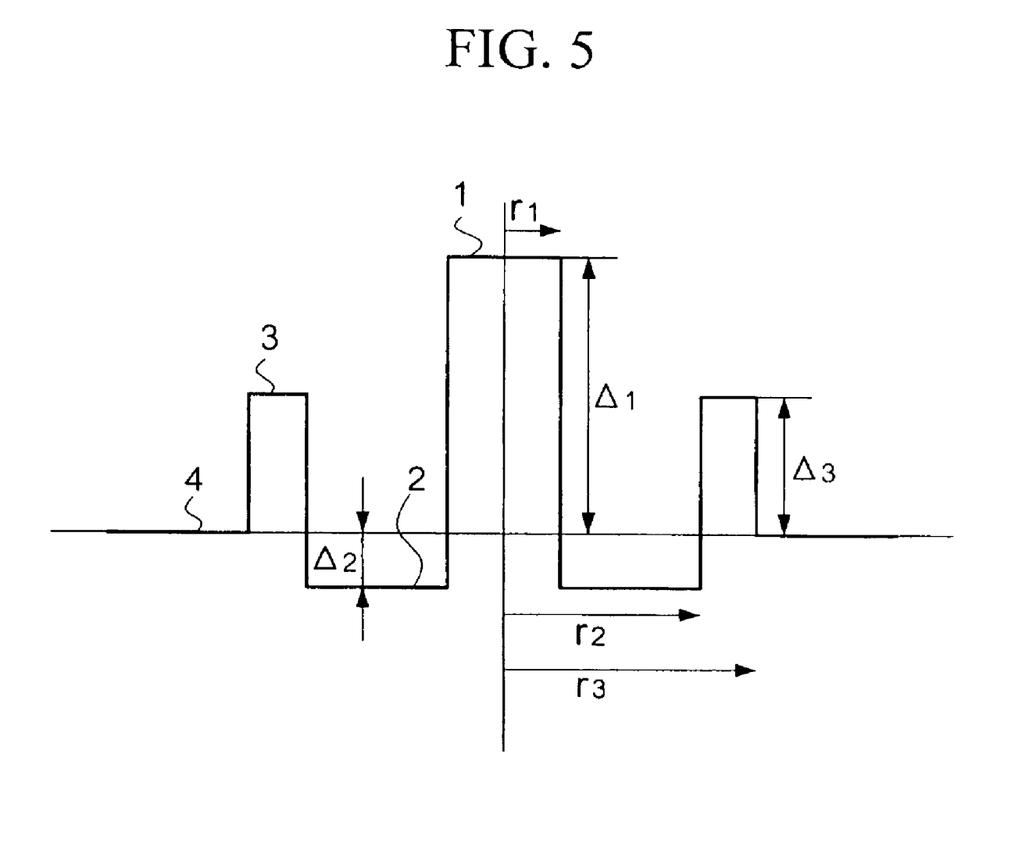
FIG. 5 is a graph showing a second example of a refractive index profile for the present invention's optical fiber.

In order to have these types of characteristics, it is necessary to have a refractive index profile such as shown in FIG. 3 or in FIG. 5.

The first example of a refractive index profile shown in FIG. 3 is formed on a central core 1, a middle part 2 provided around the outer periphery of central core 1, and a cladding 4 which is provided around the outer periphery of middle part 2. The relationship between the refractive indices of these layers is such that the refractive index of middle part 2 is less than that of central core 1, and the refractive index of cladding 4 is higher than middle part 2 but lower than central core 1.

Central core 1 of this optical fiber is formed of pure quartz glass or of quartz glass doped with germanium that has the effect of increasing the refractive index; middle part 2 is formed of pure quartz glass or quartz glass doped with fluorine that has the effect of decreasing the refractive index; and cladding 4 is formed of quartz glass, fluorine-doped glass, or quartz glass doped with chlorine that has the effect of raising the refractive index.

This optical fiber can be fabricated using a VAD method, for example.

When the radius of central core 1 is designated as $r_1$ and the radius of middle part 2 (core radius) is designated as $r_2$, then it is preferable that $3.0 \leq r_2/r_1 \leq 5.0$. If $r_2/r_1$ is less than 3.0, then the light's electric field passes through middle part 2 and readily reaches cladding 4, so that bending loss tends to increase. Moreover, when $r_2/r_1$ exceeds 5.0, then the effect of providing a middle part 2 decreases and the light's electric field is too strongly enclosed in the core. As a result, the effect provided by increasing Aeff tends to diminish.

The cut-off wavelength can be shifted to the longer wavelengths by increasing the value of $r_1$. The cut-off wavelength is set based on the length of the optical fiber used and on the employed wavelength band. For this reason, in general, the numerical limits for $r_1$ cannot be expressed, however, typically, $r_1$ is selected from the range of 5~20 μm.

The outer diameter of cladding 4 is typically 125 μm.

The relative refractive index differences for the middle portion 2 and the central core 1 when taking the refractive index of the cladding 4 as the standard are designed as $\Delta_1$ and $\Delta_2$ respectively. In this case, it is preferable that $\Delta_1$ be 0.30% or less, and preferably 0.26% or less, and $\Delta_2$ be −0.05~0.15%.

When $\Delta_1$ exceeds 0.30%, it becomes difficult to increase Aeff. Further, when $\Delta_2$ becomes larger than −0.05% (i.e., the absolute value of $\Delta_2$ become smaller), then bending loss increases. When $\Delta_2$ becomes smaller than −0.15% (i.e., when the absolute value of $\Delta_2$ becomes larger), then Aeff tends to decrease.

Figure 4:
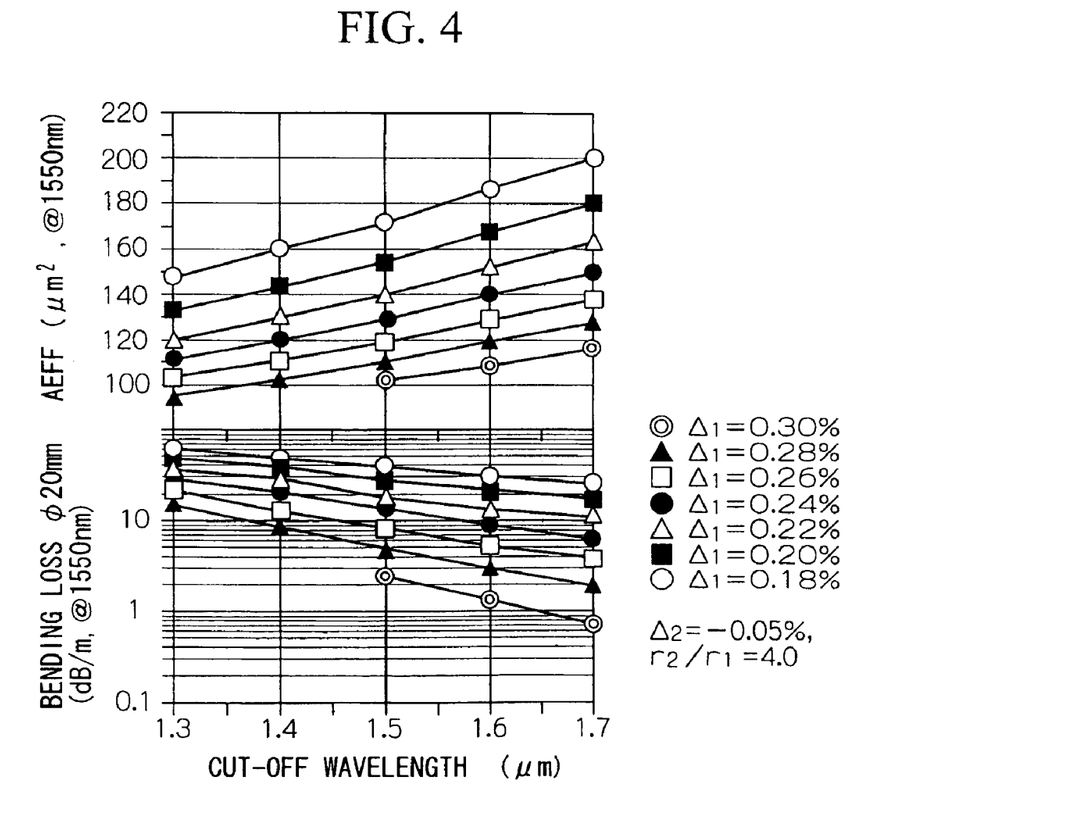
FIG. 4 is a graph showing the relationship between the cut-off wavelength according to the 2 m method, and Aeff and bending loss at an employed wavelength of 1.55 µm, when varying the structural parameters shown in FIG. 3.

FIG. 4 is graph showing the change in Aeff and bending loss at a 1.55 μm employed wavelength when setting $\Delta_2$ to −0.05% and $r_2/r_1$ to 4.0, and varying the cut-off wavelength according to the 2 m method by 0.1 μm increments within the range of 1.3~1.7 μm.

Aeff tends to decrease and bending loss tends to increase as the value of $r_1$ decreases and the cut-off wavelength shifts to the short wavelengths. On the other hand, Aeff tends to increase and bending loss tends to decrease as the value of $r_1$ increases and the cut-off wavelength shifts to the long wavelengths.

The straight lines shown in the graph are determined for each value of $\Delta_1$. $\Delta_1$ is set at intervals of 0.02% in the range of 0.18~0.30%.

Aeff tends to decrease as $\Delta_1$ increases.

The bending loss tends to decrease as $\Delta_1$ increases.

$\Delta_2$, $r_2/r_1$ and the employed wavelength value are set in this way. By selecting the various structural parameters that satisfy the conditions for the present invention's Aeff, bending loss, and cut-off wavelength based on the graph in which the value of $r_1$ is varied, an optical fiber can be designed that has the refractive index profile shown in FIG. 3 and which satisfies the conditions for the present invention. Further, it is preferable to design this optical fiber while taking into consideration the conditions for the increase in the sandpaper tension winding loss.

Accordingly, even if an optical fiber has the refractive index profile shown in FIG. 3 and satisfies the desirable numerical limits for $r_2/r_1$, $\Delta_1$, and $\Delta_2$ as described above, this does not mean that it will absolutely satisfy the Aeff, bending loss, cut-off wavelength and increase in the sandpaper tension winding loss characteristics as described above. Rather, the unique characteristic of the present invention's optical fiber is realized by suitably combining these structural parameters.

For this reason, it is difficult to specify the present invention from the numerical limits for these structural parameters. Rather, the present invention is specified based on the refractive index profile and the characteristic values of the optical fiber. This of course has not been possible in the conventional art.

FIG. 5 shows a second example of the refractive index profile for the present invention's optical fiber.

This refractive index profile differs from that of the first example shown in FIG. 3 in that a ring core 3 has been provided in between middle part 2 and cladding 4. In general, this type of refractive index profile is referred to as a "ring profile".

The refractive index of ring core 3 is higher than that of middle part 2 and cladding 4, but is lower than that of central core 1.

In this optical fiber, central core 1 and ring core 3 are comprised of germanium-doped quartz glass, middle part 2 is comprised of fluorine-doped quartz glass or pure quartz glass, and cladding 4 is comprised of pure quartz glass or chlorine-doped quartz glass, for example.

As in the case of the first example, this optical fiber can also be fabricated using a VAD method, for example.

The radius of ring core 3 (i.e., the core radius) is designated as $r_3$ in this example. In this case, it is preferable that $3.0 \leq r_2/r_1 \leq 4.0$, and $4.0 \leq r_3/r_1 \leq 5.0$. When $r_2/r_1$ is less than 3.0, then the light's electric field distribution tends to pass through middle part 2 and readily reach ring core 3. As a result, bending loss tends to increase. Further, when $r_2/r_1$ exceeds 4.0, then the light is too strongly contained within the core, so that the effect of providing a middle part 2 is reduced. As a result, the effect obtained from increasing Aeff is diminished. In addition, when $r_3/r_1$ is less than 4.0, then the effect of providing a ring core 3 is reduced. As a result, the effect obtained from increasing Aeff is diminished. Finally, when $r_3/r_1$ exceeds 5.0, bending loss tends to increase.

As discussed above, it is possible to shift the cut-off wavelength to the longer wavelengths by increasing the value of $r_1$. In this example, typically, $r_1$ is selected from the range of 5~20 μm.

The outer diameter of cladding 4 is typically around 125 μm.

In this example, the relative refractive index of the ring core 3 when the refractive index of the cladding 4 is taken as the standard is designated as $\Delta_3$. In this case, it is preferable that $\Delta_1$ be 0.35% or less, $\Delta_2$ be 0~-0.2%, and $\Delta_3$ be +0.05~+0.2%.

When $\Delta_1$ exceeds 0.35%, it becomes difficult to increase Aeff. When $\Delta_2$ becomes smaller than -0.2% (i.e., the absolute value of $\Delta_2$ increases), then Aeff tends to decrease. Further, when $\Delta_3$ is less than +0.05, then the effect of providing a ring core 3 is decreased, and the effect of increasing Aeff also tends to diminish. When $\Delta_3$ exceeds +0.2%, then bending loss tends to increase.

However, as in the case of the first example, even in an optical fiber that has the refractive index profile shown in FIG. 5 and satisfies the desirable numerical limits for $r_2/r_1$, $r_3/r_1$, $\Delta_1$, $\Delta_2$ and $\Delta_3$ as described above, this does not mean that it will absolutely satisfy the Aeff, bending loss, cut-off wavelength and increase in sandpaper tension winding loss characteristics described above. The unique characteristics of the present invention are realized by suitably combining these structural parameters.

In the present invention, by suitably adjusting the structural parameters in an optical fiber having a refractive index profile of a relatively simple structure such as shown in FIGS. 3 and 5, it is possible to provide an optical fiber at low cost in which Aeff is increased and bending loss is decreased, and that has a cut-off wavelength that is capable of single mode propagation in an employed wavelength band that is selected from the range of 1.53~1.63 μm. Moreover, it is possible to reduce the increase in the sandpaper tension winding loss.

As a result, it is possible to provide an optical fiber in which worsening transmission loss is avoided by decreasing nonlinearity in an employed wavelength band selected from the range of 1.53~1.63 μm. At the same time, worsening transmission loss due to microbending that occur in the optical fiber during installation becomes less likely, and single mode propagation can be assured.

It is possible to construct an optical transmission system by combining the present invention's optical fiber with a so-called dispersion compensating optical fiber. The employed wavelength band in this optical transmission system is the same as that for the present invention's optical fiber.

The dispersion compensating optical fiber has a wavelength dispersion value that is a different sign and has a large absolute value compared with the wavelength dispersion value of the optical fiber that forms the majority of the transmission path. Similarly, the dispersion slope is a value that has a different sign and has a large absolute value compared with the dispersion slope of the optical fiber that forms most of the transmission path.

The dispersion slope is the slope of the curve that is obtained by plotting the wavelength dispersion value where the wavelength is plotted on the horizontal axis and the wavelength dispersion value is plotted on the vertical axis. The dispersion slope is an index that expresses the dependence of the wavelength dispersion value on wavelength. Where sending optical signals having multiple different wavelengths, as in the case of wavelength multiplexing transmission, when the dispersion slope is large, then the transmission state between wavelength intervals deviates and causes degradation of optical signal. For this reason, when employing optical fiber in WDM (wavelength division multiplexing) transmission, it is preferable to employ a dispersion compensating optical fiber that compensates the wavelength dispersion and dispersion slope simultaneously. Moreover, depending on the application, it is also possible to use a dispersion compensating optical fiber that compensates the dispersion slope only.

The present invention's optical fiber may be disposed to the side at which the optical signal incidents, and a dispersion compensating optical fiber may be disposed on the side where the optical signal is emitted. As a result, the dispersion slope or the wavelength dispersing value, which accumulate due to transmission through the optical fiber on the incidenting side, are negated by the relating short dispersion compensating optical fiber on the emitting side. As a result, one or both of the dispersion slope and the average wavelength dispersion value become smaller when these optical fibers are combined (i.e., when the optical fiber and the dispersion compensating optical fiber are combined). Thus, it is possible to control the transmission loss that is caused by wavelength dispersion.

Moreover, the present invention's optical fiber has a large Aeff, making it possible to limit the transmission loss that is caused by nonlinearity. As a result, it is possible to construct an optical transmission system having extremely good transmission characteristics.

In this optical transmission system, S1 is the value obtained when the length of the optical fiber employed is multiplied with the dispersion slope per unit length of the optical fiber that is the object of compensation. S2 is the value obtained when the length of the dispersion compensating optical fiber employed is multiplied with the dispersion slope per unit length of the dispersion compensating optical fiber.

In addition, the ratio of the absolute value of S2 to the absolute value of S1 is referred to as the "dispersion slope compensation ratio".

In this optical transmission system, it is preferable to set the length of the optical fiber employed, the characteristics of the dispersion compensating optical fiber and the length of the dispersion compensating optical fiber employed so that the compensation ratio of the dispersion slope will be 80% or more.

Provided that it can compensate one or both of the wavelength dispersion value and the dispersion slope for the present invention's optical fiber, then the dispersion compensating optical fiber employed in the present invention's optical transmission system is not particularly restricted.

For example, a dispersion compensating optical fiber having the same refractive index profile as that shown in FIG. 3 and provided with the characteristics of a dispersion compensating optical fiber by adjusting these structural parameters may be cited as an example of a dispersion compensating optical fiber suitably employed in the present invention. These structural parameters are suitably adjusted based on the dispersion slope or the wavelength dispersion value of the optical fiber that is the object of compensation.

Specifically, it is preferable that the dispersion compensating optical fiber has −15~−140 ps/nm/km of the wavelength dispersion in the employed wavelength band. Further, it is preferable that the dispersion compensating optical fiber has a dispersion slope compensation ratio of 80% or more when compensating the aforementioned optical fiber with a length of the compensating optical fiber such that the compensating optical fiber can compensate the wavelength dispersion of the optical fiber to be compensated to zero, the dispersion compensating optical fiber has a bending loss of 100 dB/m or less, preferably 40 dB/m or less. If the bending loss is small in this way, then the transmission loss is small even if the dispersion compensating optical fiber is rendered into a cable and inserted into an optical transmission system.

The reference above to a "length such that it can compensate the wavelength dispersion of the optical fiber to be compensated to zero" refers to the length which can be obtained by dividing the value obtained by multiplying the length of the optical fiber employed with the absolute value of the wavelength dispersion per unit length of the optical fiber, by the absolute value of the wavelength dispersion per unit length of the dispersion compensating optical fiber. By using the optical fiber and the dispersion compensating optical fiber at these employed lengths, the wavelength dispersion in the optical transmission system theoretically should become zero.

Specifically, a dispersion compensating optical fiber having the same refractive index profile as shown in FIG. 5 which satisfies the following conditions is desirable.

Namely, this dispersion compensating optical fiber has a core and a cladding 4 that is provided around the outer periphery of this core. The core consists of a central core 1 that has a higher refractive index than that of cladding 4; a middle part 2 that is provided around the outer periphery of central core 1 and has a lower refractive index than cladding 4; and a ring core 3 that is provided around the outer periphery of middle core 2 and has a higher refractive index than that of cladding 4.

$r_1$ is in the range of 2~3 μm, $\Delta_1$ is in the range of 0.9~1.5%, $\Delta_2$ is in the range of −0.35~−0.45%, $\Delta_3$ is in the range of 0.2~1.2%, $r_2/r_1$ is in the range of 2.0~3.5, and $r_3/r_1$ is in the range of 3.0~5.0. In the employed wavelength band, the effective core area is 20 μm² or more, preferably 25 μm² or more, the bending loss is 40 dB/m or less, and the wavelength dispersion is in the range of −65~−45 ps/nm/km. This dispersion compensating optical fiber has a cut-off wavelength capable of substantially single mode propagation. Further, this dispersion compensating optical fiber has a dispersion slope compensation ratio of 80~120% when compensating the aforementioned single mode optical fiber with a length of the compensating optical fiber that can compensate the wavelength dispersion of the optical fiber to zero.

As in the case of the present invention's optical fiber, by selecting and combining suitable values from numerical limits for the preceding structural parameters of this dispersion compensating optical fiber, it is possible to realize desirable characteristics.

This dispersion compensating optical fiber has low loss and does not readily give rise to nonlinearity. Thus, this is advantageous in that, even if there is a slight variation in the structural parameters during fabrication, the wavelength dispersion and dispersion slope do not readily change, so that product yield remains high.

Note that is cladding 4 is formed from quartz glass to which a slight amount of fluorine has been doped, then a dispersion compensating optical fiber can be obtained that has particularly low transmission loss.

As in the case of the present invention's optical fiber, these dispersion compensating optical fibers may also be fabricated using VAD, MCVD, PCVD or similar methods. Further, the same materials may be employed for each of the layers in the dispersion compensating optical fiber as were used in the present invention's optical fiber.

It is preferable that the average wavelength dispersion value in an optical transmission system that compensates for wavelength dispersion using a dispersion compensating optical fiber in this way be as small as possible. By incorporating a suitable dispersion compensating optical fiber, and selecting the employed length therefore, in a system employing the present invention's optical fiber, it is possible to obtain a wavelength dispersion range of −6~+6 ps/km/nm.

Embodiment

Embodiments of the present invention will now be explained in detail.

EXAMPLE 1

An optical fiber having the refractive index profile shown in FIG. 3 was fabricated using the VAD method. The central core was comprised of germanium-doped quartz glass, the middle part was comprised of fluorine-doped quartz glass, and the cladding was comprised of pure quartz glass.

The $\Delta_1$ and $\Delta_2$ in this optical fiber were 0.24% and −0.05%, respectively. $r_1$ and $r_2$ were 6.6 μm and 26.5 μm, respectively. The outer diameter of the cladding was 125 μm. The characteristics of this optical fiber are shown in Table 1. Each of the characteristic values were measured at 1.55 μm. The cut-off wavelength was measured using the 2 m method.

TABLE 1

| $\Delta_1$ | $\Delta_2$ | $r_1:r_2$ | Wavelength (μm) | Cut-off wavelength (μm) | Aeff (μm²) | MFD (μm) |
|---|---|---|---|---|---|---|
| 0.24 | −0.05 | 1:4.0 | 1.550 | 1.55 | 132 | 12.7 |

| bending loss (dB/m) 2R = 20 mm | Transmission loss (dB/km) | Wavelength dispersion (ps/nm/km) | Dispersion slope (ps/nm²/km) | increase in sandpaper tension winding loss (dB/km) | outer diameter of coating (μm) |
|---|---|---|---|---|---|
| 10.2 | 0.188 | +20.7 | +0.062 | 0.15 | 400 |

EXAMPLE 2

An optical fiber was prepared in the same manner as in Example 1, with the exception that the central core was comprised of pure quartz glass and the cladding was comprised of fluorine-doped quartz glass.

The optical characteristics of this optical fiber were the same as those shown in Table 1 for the optical fiber in Example 1, with exception that the transmission loss was 0.178 dB/km, 0.01 dB/km less than the optical fiber in Example 1.

EXAMPLE 3

An optical fiber having the refractive index profile shown in FIG. 5 was fabricated using the VAD method. The central core and the ring core were comprised of germanium-doped quartz glass, the middle part was comprised of fluorine-doped quartz glass, and the cladding was comprised of pure quartz glass.

The $\Delta_1$, $\Delta_2$, and $\Delta_3$ in this optical fiber were 0.28%, −0.05%, and +0.13%, respectively. $r_1$, $r_2$ and $r_3$ were 7.75 μm, 26.35 μm, and 31 μm, respectively. The outer diameter of the cladding was approximately 125 μm.

The characteristics of this optical fiber are shown in Table 2. Each of the characteristic values was measured at 1.55 μm. The cut-off wavelength was measured using the 2 m method.

TABLE 2

| $\Delta_1$ | $\Delta_2$ | $\Delta_3$ | $r_1:r_2:r_3$ | Wavelength | Core radius (μm) | cut-off wavelength (μm) | Aeff (μm$^2$) | MFD (μm) |
|---|---|---|---|---|---|---|---|---|
| 0.28 | −0.05 | 0.13 | 1:3.4:4.0 | 1.550 | 31 | 1.59 | 156 | 13.5 |

| bending loss (dB/m) 2R = 20 mm | Transmission loss (dB/km) | Wavelength dispersion (ps/nm/km) | dispersion slope (ps/nm$^2$/km) | increase in sandpaper tension winding loss (dB/km) | outer diameter of coating (μm) |
|---|---|---|---|---|---|
| 4.0 | 0.188 | +21.2 | +0.064 | 0.72 | 400 |

COMPARATIVE EXAMPLE 1

An optical fiber was fabricated that has a staircase refractive index profile in which cladding with a low refractive index was provided around a core that had a high refractive index. The core was comprised of germanium-doped quartz glass and the cladding was comprised of pure quartz glass.

The difference in the relative refractive index in this optical fiber when taking the refractive index of the cladding as the standard was 0.34%. The core radius was 4.8 μm and the cladding outer diameter was approximately 125 μm.

The measured value of Aeff at 1.55 μm in this optical fiber was approximately 88 μm$^2$, the bending loss was 5 dB/m and the cut-off wavelength using the 2 m method was 1.37 μm.

From the above result, it was clear that Aeff was sufficiently increased in the optical fibers of Examples 1~3 according to the present invention. Further, it was clear that these optical fibers had small bending losses and small increases in the sandpaper tension winding loss, and were capable of single mode propagation at 1.55 μm.

In addition, it was clear that Aeff could be more greatly increased in these optical fibers than in the optical fiber of Comparative Example 1, enabling a decrease in nonlinearity.

EXAMPLE 4

The optical fiber of Example 2 and a dispersion compensating optical fiber for compensating the dispersion slope and wavelength dispersion of the optical fiber from Example 2 were fabricated. The dispersion compensating optical fiber was connected to the optical fiber on the side where the optical signal is emitted, to form the optical transmission system. The optical fiber of Example 2 was 30.9 km and the dispersion compensating optical fiber was 5.0 km, so that the total transmission path was 35.9 km.

A dispersion compensating optical fiber was employed that had the same refractive index profile as shown in FIG. 3, and had a dispersion slope and wavelength dispersion value for a signal that differed from that of the optical fiber of Example 2 by adjusting these structural parameters. The material and the fabrication method were the same as those employed in Example 2.

The structural parameters, characteristics, and dispersion slope compensation ratio of this dispersion compensating optical fiber are shown in Table 3.

TABLE 3

| $\Delta_1$ (%) | $\Delta_2$ (%) | $r_2$ (μm) | $r_2/r_1$ | employed wavelength (μm) | transmission loss (dB/km) |
|---|---|---|---|---|---|
| 2.3 | −0.45 | 3.7 | 3.5 | 1.55 | 0.48 |

| Wavelength dispersion (ps/nm/km) | Dispersion slope (ps/nm$^2$/km) | Dispersion slope compensation ratio (%) | bending loss (dB/m) 2R = 20 mm | outer diameter of coating (μm) |
|---|---|---|---|---|
| −131 | −0.36 | 92.5 | 5 | 250 |

The average wavelength dispersion value for the transmission path when the dispersion compensating optical fiber and the optical fiber of Example 2 were combined was almost zero at 1.55 μm. The remaining dispersion slope was +0.147 ps/nm$^2$ over the entire length of the transmission path. When calculated per unit length, an extremely small dispersion slope of +0.004 ps/km/nm$^2$ was obtained.

Thus, the optical fiber of Example 2 according to the present invention is employed on the side at which the optical signal incidents. The Aeff of this optical fiber is large, so that there is almost no degradation of optical signal due to nonlinearity, and the dispersion slope and wavelength dispersion value can be compensated on the side at which the optical signal was emitted. For this reason, there is no degradation of optical signal characteristics caused by dispersion properties, so that an optical transmission system having extremely good transmission characteristics can be obtained.

EXAMPLE 5

An optical fiber was fabricated in the same manner as in Example 1, with the exception that $\Delta_1$ and $\Delta_2$ were 0.25% and −0.05%, and $r_1$ and $r_2$ were 6.7 μm and 26.8 μm, respectively.

The characteristics of this optical fiber are shown in Table 4. Each of the characteristic values was measured at 1.55 μm. The cut-off wavelength was measured using the 2 m method.

TABLE 4

| $\Delta_1$ | $\Delta_2$ | $r_1:r_2$ | wavelength | cut-off wavelength (μm) | Aeff (μm$^2$) | MFD (μm) |
|---|---|---|---|---|---|---|
| 0.25 | −0.05 | 1:4.0 | 1.550 | 1.59 | 133 | 12.7 |

| Bending loss (dB/m) 2R = 20 mm | Transmission loss (dB/km) | Wavelength dispersion (ps/nm/km) | dispersion slope (ps/nm$^2$/km) | Increase in sandpaper tension winding loss (dB/km) | outer diameter of coating (μm) |
|---|---|---|---|---|---|
| 7.4 | 0.188 | +20.7 | +0.062 | 3.7 | 250 |

EXAMPLE 6

An optical fiber was fabricated in the same manner as in Example 1, with the exception that $r_1$ and $r_2$ were 6.9 μm and 27.5 μm, respectively.

The characteristics of this optical fiber are shown in Table 5. Each of the characteristic values was measured at 1.55 μm. The cut-off wavelength was measured using the 2 m method.

TABLE 5

| $\Delta_1$ | $\Delta_2$ | $r_1:r_2$ | wavelength | cut-off wavelength (μm) | Aeff (μm$^2$) | MFD (μm) |
|---|---|---|---|---|---|---|
| 0.24 | −0.05 | 1:4.0 | 1.550 | 1.60 | 140 | 13.0 |

| Bending loss (dB/m) 2R = 20 mm | Transmission loss (dB/km) | Wavelength dispersion (ps/nm/km) | dispersion slope (ps/nm$^2$/km) | Increase in sandpaper tension winding loss (dB/km) | outer diameter of coating (μm) |
|---|---|---|---|---|---|
| 9.2 | 0.185 | +20.8 | +0.063 | 5.0 | 250 |

EXAMPLE 7

The optical fiber of Example 5 and a dispersion compensating optical fiber for compensating the dispersion slope and wavelength dispersion value of the optical fiber from Example 5 were fabricated. The dispersion compensating optical fiber was connected to the optical fiber on the side where the optical signal is emitted, to form the optical transmission system. The optical fiber of Example 5 was 32.63 km and the dispersion compensating optical fiber was 12.37 km, so that the total transmission path was 45.00 km.

A dispersion compensating optical fiber was employed that had the same refractive index profile as shown in FIG. 5, and had a dispersion slope and wavelength dispersion value for a signal that differed from that of the optical fiber of Example 5 by adjusting these structural parameters. The central core and ring core were comprised of germanium-doped quartz glass, the middle part was comprised of fluorine-doped quartz glass, and a MCVD method was employed for the fabrication method.

The structural parameters, characteristics, and dispersion slope compensation ratio of this dispersion compensating optical fiber are shown in Table 6.

TABLE 6

| $\Delta_1$ (%) | $\Delta_2$ (%) | $\Delta_3$ (%) | $r_3$ (μm) | $R_2/r_1$ | $r_3/r_1$ | Employed wavelength (μm) | transmission loss (dB/km) | Aeff (μm$^2$) |
|---|---|---|---|---|---|---|---|---|
| 1.0 | −0.40 | 6.8 | 6.8 | 3.0 | 3.5 | 1.55 | 0.29 | 26.6 |

| Wavelength dispersion (ps/nm/km) | Dispersion slope (ps/nm$^2$/km) | Dispersion slope compensation ratio (%) | Bending loss (dB/m) 2R = 20 mm | outer diameter of coating (μm) |
|---|---|---|---|---|
| −54.6 | −0.16 | 98 | 16.5 | 250 |

The average wavelength dispersion value for the transmission path when the dispersion compensating optical fiber and the optical fiber of Example 5 were combined was almost zero at 1.55 μm. The remaining dispersion slope was +0.044 ps/nm$^2$ over the entire length of the transmission path. When calculated per unit length, an extremely small dispersion slope of +0.001 ps/km/nm$^2$ was obtained.

Thus, the optical fiber of Example 5 according to the present invention is employed on the side at which the optical signal incidents. The Aeff of this optical fiber is large, so that there is almost degradation of optical signal due to nonlinearity, and the dispersion slope and wavelength dispersion value can be compensated on the side at which the optical signal was emitted. For this reason, there is no degradation of optical signal characteristics caused by dispersion properties, so that an optical transmission system having extremely good transmission characteristics can be obtained.

What is claimed:

1. An optical fiber provided with a refractive index profile having a central core; a middle part provided around the outer periphery of said central core and having a lower refractive index than that of said central core; and a cladding provided around the periphery of said middle part and having a higher refractive index than said middle part and a lower refractive index than said central core;
   wherein said optical fiber has an effective core area of at least 120 μm$^2$ in an employed wavelength band selected from the range of 1.53 to 1.63 μm, and has a cut-off wavelength that is capable of substantially single mode propagation in said employed wavelength band, and
   when the radius of the central core is designated as $r_1$ and the radius of the middle part is designated as $r_2$, then $3.0 \leq r_2/r_1 \leq 5.0$, and, when specific refractive index differences for the central core and the middle part are designated as $\Delta_1$ and $\Delta_2$ respectively where the refractive index of the cladding is taken as the standard, then $\Delta_1$ is at most 0.30% and $\Delta_2$ is −0.05 to −0.15%.

2. An optical fiber according to claim 1, characterized in that the effective core area is 140 μm$^2$ or more.

3. An optical fiber according to claim 1, characterized in that the bending loss is 100 dB/m or less.

4. An optical fiber according to claim 1, characterized in that the bending loss is 20 dB/m or less.

5. An optical fiber according to claim 1, characterized in that the increase in the sandpaper tension winding loss is at most 10 dB/km.

6. An optical fiber according to claim 1, characterized in that the increase in the sandpaper tension winding loss is at most 1 dB/km.

7. An optical fiber according to claim 1, characterized in that the effective core area is 120 to 150 μm$^2$, and the increase in the sandpaper tension winding loss is at most 0.3 dB/km.

8. An optical fiber according to claim 1, characterized in that $\Delta_1$ is at most 0.26%.

9. An optical transmission system characterized in that a dispersion compensating optical fiber is disposed to the side of the optical fiber according to claim 1 at which the optical signal is emitted, said dispersion compensating optical fiber compensating one or both of this optical fiber wavelength dispersion value and dispersion slope.

10. An optical transmission system according to claim 9, characterized in that the dispersion compensating optical fiber has an effective core are being at least 25 μm$^2$.

11. An optical transmission system according to claim 9, wherein the average wavelength dispersion value when an optical fiber and a dispersion compensating optical fiber are combined is in the range of −6 to +6 ps/nm/km.

12. An optical fiber provided with a refractive index profile having a central core; a middle part provided around the outer periphery of said central core and having a lower refractive index than that of said central core; a cladding provided around the periphery of said middle part and having a higher refractive index than said middle part and a lower refractive index than said central core; and a ring core provided between the middle part and the cladding and having a higher refractive index than that of said middle part and said cladding and a lower refractive index than that of the central core;

wherein said optical fiber has an effective core area of 120 μm² or more in an employed wavelength band selected from the range of 1.53 to 1.63 μm, and has a cut-off wavelength that is capable of substantially single mode propagation in said employed wavelength band, and when the radius of the central core is designated as $r_1$, the radius of the middle part is designated as $r_2$, and the radius of the ring core is designated as $r_3$, then $3.0 \leq r_2/r_1 \leq 4.0$ and $4.0 \leq r_3/r_1 \leq 5.0$, and when the specific refractive index differences for the central core, the middle part, and the ring core are designated as $\Delta_1$, $\Delta_2$ and $\Delta_3$ respectively where the refractive index of the cladding is taken as the standard, then $\Delta_1$ is at most 0.35%, $\Delta_2$ is 0 to 0.2% and $\Delta_3$ is +0.05 to 0.2%.

13. An optical transmission system including a dispersion compensating optical fiber disposed to the side of an optical fiber at which the optical signal is emitted, wherein the optical fiber is provided with a refractive index profile having a central core; a middle part provided around the outer periphery of said central core and having a lower refractive index than that of said central core; and a cladding provided around the periphery of said middle part and having a higher refractive index than said middle part and a lower refractive index than said central core; and the optical fiber has an effective core area of at least 120 μm² in an employed wavelength band selected from the range of 1.53 to 1.63 μm, and has a cut-off wavelength that is capable of substantially single mode propagation in said employed wavelength band; and said dispersion compensating optical fiber compensates one or both of the optical fiber wavelength dispersion value and dispersion slope, and is provided with a core and a cladding that is provided around the outer periphery of said core, said core consisting of a central core having a higher refractive index than said cladding, a middle part that is provided around the outer periphery of said central core and has a lower refractive index than said cladding, and a ring core that is provided around the outer periphery of said middle core part and has a higher refractive index than said cladding in which when the radius and the relative refractive index difference, with the cladding taken as the standard, for the central core, middle part, and ring core are designated as $(r_1, \Delta_1)$, $(r_2, \Delta_2)$ and $(r_3, \Delta_3)$, respectively, then $r_1$ is 2 to 3 μm, $\Delta_1$ is 0.9 to 1.5%, $\Delta_2$ is −0.35 to −0.45%, $\Delta_3$ is 0.2 to 1.2%, $r_2/r_1$ is 2.0 to 3.5, and $r_3/r_1$ is 3.0 to 5.0;

a cut-off wavelength is provided that is capable of substantially single mode propagation, in which the effective core area is at least 20 μm², the bending loss is at most 40 dB/m, and the wavelength dispersion is −65 to −45 ps/nm/km, in an employed wavelength band selected from the range 1.53 μm to 1.63 μm; and the dispersion slope compensation ratio is in the range of 80 to 120% when compensating said optical fiber with a length of the dispersion compensating optical fiber capable of compensating to zero the wavelength dispersion of the optical fiber to be compensated.

* * * * *

UNITED STATES PATENT AND TRADEMARK OFFICE
CERTIFICATE OF CORRECTION

PATENT NO. : 7,076,139 B1
APPLICATION NO. : 09/635109
DATED : July 11, 2006
INVENTOR(S) : Kazuhiko Aikawa et al.

It is certified that error appears in the above-identified patent and that said Letters Patent is hereby corrected as shown below:

Claim 1 Column 14, line 34 please change "is at most 0.30%" to --is 0.30% or less--;
Claim 5 Column 14 lines 42-43 please change "is at most 10 dB/km" to --is 10 dB/km or less--;
Claim 6 Column 14 lines 45-46 please change "is at most 1 dB/km" to --is 1dB/km or less--;
Claim 7 Column 14 line 49-50 please change "is at most 0.3 dB/km" to --is 0.3 dB/km or less--;
Claim 8 Column 14 line 52 please change "is at most 0.26%" to --is 0.26% or less--;
Claim 10 Column 14 line 61 please change "at least 25 $\mu m^2$" to --25 $\mu m^2$ or more--.
Claim 12 Column 15 line 18 please change "$4.0 \leq r_3/r_{1b} \leq 5.0$" to --$4.0 \leq r_3/r_1 \leq 5.0$--;
Claim 12 Column 15 lines 22-23 please change "is at most 0.35%" to --is 0.35% or less--;
Claim 13 Column 15 line 35 please change "of at least 120 $\mu m$" to --of 120 $\mu m^2$ or more--.
Claim 13 Column 16 line 25 please change "of at least 20 $\mu m^2$" to --of 20 $\mu m^2$ or more--;
Claim 13 Column 16 lines 25-26 please change "is at most 40 dB/m" to --is 40 dB/m or less--.

Signed and Sealed this

Fifth Day of December, 2006

JON W. DUDAS
*Director of the United States Patent and Trademark Office*